United States Patent [19]

Powers

[11] 4,452,229
[45] Jun. 5, 1984

[54] THERMAL HEAT STORAGE AND COOLING SYSTEM

[76] Inventor: Kim Powers, 2740 Kiawah Ave., Columbia, S.C. 29205

[21] Appl. No.: 321,222

[22] Filed: Nov. 13, 1981

[51] Int. Cl.³ .............................................. F25B 13/00
[52] U.S. Cl. ................................... 126/429; 126/400; 126/436; 126/430; 165/45
[58] Field of Search .............. 126/429, 430, 436, 400, 126/422; 165/45, 48 S

[56] References Cited

U.S. PATENT DOCUMENTS

| | | | |
|---|---|---|---|
| 965,391 | 7/1910 | Little | |
| 2,680,565 | 6/1954 | Löf | 126/429 |
| 3,624,356 | 11/1971 | Havill | 126/400 |
| 4,024,910 | 5/1977 | Werner | 165/45 |
| 4,033,130 | 7/1977 | Hermans | 126/400 |
| 4,051,999 | 10/1977 | Granger et al. | 126/429 |
| 4,088,115 | 5/1978 | Powell | 126/429 |
| 4,088,266 | 5/1978 | Keyes | 126/429 |
| 4,121,764 | 10/1978 | Hope et al. | 237/1 A |
| 4,127,973 | 12/1978 | Kachadorian | 165/45 |
| 4,137,898 | 2/1979 | Koizumi et al. | 126/429 |
| 4,138,061 | 2/1979 | Besack | 237/1 A |
| 4,149,520 | 4/1979 | Arent | 126/270 |
| 4,160,443 | 7/1979 | Brindle et al. | 126/270 |
| 4,173,304 | 11/1979 | Johnson | 237/1 A |
| 4,196,719 | 4/1980 | Skrivseth | 126/430 |
| 4,207,868 | 6/1980 | Peterson | 126/449 |
| 4,213,447 | 7/1980 | Erickson | 126/430 |
| 4,286,575 | 9/1981 | Gates | 126/429 |
| 4,304,219 | 12/1981 | Currie | 126/429 |
| 4,350,200 | 9/1982 | McElwain | 165/48 S |
| 4,373,573 | 2/1983 | Madwed | 126/429 |

Primary Examiner—Samuel Scott
Assistant Examiner—Noah P. Kamen
Attorney, Agent, or Firm—Benoni O. Reynolds

[57] ABSTRACT

An improved heat storage and cooling system utilizing a conventional solar energy collector as a heat source, a thermal mass of stacked cement blocks with interal horizontally aligned air passageways for warm or cool air storage and a dual-purpose structural wall of staggered hollow cement blocks to generate cool air. The system is self-contained and multi-functional, located either in a fully bermed room adjacent on any side to the area to be serviced or in a basement room embedded in the earth beneath the area to be serviced. The circulation system of metal ducts, pipes, air handler, circulating fan, gas heater and dampers interconnects the solar energy collector, the thermal mass and cooling walls to provide seven modes of operation for the storage of heat or cold and the circulation of warm or cool air as circumstances may require.

8 Claims, 5 Drawing Figures

THERMAL HEAT STORAGE AND COOLING SYSTEM

BACKGROUND OF INVENTION (1) Field of Invention

This invention relates to thermal heating and cooling systems for generating, storing and circulating warm and cool air primarily for residential use. More particularly it relates to heat storage and cooling apparatus for homes.

(2) Description of Prior Art

The high cost of utilities has spurred on many efforts to collect solar energy for heating purposes. Similar attempts have been made to utilize rocks or earth for the storage of heat or cold for future use. However, most of the prior art has been single purpose in that the systems developed have addressed solely the collection and storage of heat or the collection and storage of cold air. Few systems have been addressed to both objectives. By far, the majority effort has dealt with heating objectives with less emphasis on the cooling aspects. Further, the systems that have evolved in the prior art have been designed solely to collecting or storing energy, with little or no thought given to other possible utilitarian objectives such as structural support.

Many different media have been used for the storage of heat or cold. Rock has been used for heat storage and the earth, as well as extensive underground ducting, has been used for the generation of cool air. The inefficency or the high cost of most such apparatus has limited their large scale utilization by the general public. Many systems are not only expensive to install but pose maintenance problems as well.

Many of the thermal heat storage systems in the prior art failed to provide for the generation of cool air as an alternative mode of operation. Those systems which did include this alternate mode, did so inadequately.

Although berming is not new in the art, the technique has been used only in a limited fashion. Usually it has been used independently in improving thermal retentivity by piling earth partially around the outside walls of a home. None of the prior art, as reviewed by this inventor, has utilized the full potential of energy savings. His technique could provide for homes built on concrete slabs with topography unsuited to conventional berming treatments, an area not adequately explored in the prior art.

Prior art known to this inventor includes the following U.S. Pat. Nos.: 965,391, 7/1910, Little; 4,024,910, 5/1977, Werner; 4,121,764, 10/1978, Hope et al; 4,138,061, 2/1979, Besack; 4,149,520, 4/1979, Arent; 4,160,443, 7/1979, Brindle; 4,173,304, 11/1979, Johnson; 4,196,719, 4/1980, Skrivseth; 4,207,868, 6/1980, Peterson.

BRIEF SUMMARY OF INVENTION

The present invention is an improved thermal heat storage and cooling system which is amenable to either manual or automatic operation as heating or cooling needs might dictate. The system utilizes a conventional solar energy collector which could be mounted on a roof, in an attic or atop the bermed room which is an alternative enclosure for the heat storage and cooling media of the present invention. Heat storage is provided by a superinsulated thermal mass comprising a cube of hollow cement blocks, containing a magnesium additive, assembled on a superinsulated concrete slab. The magnesium additive increases the thermal conductance of the cement blocks. These blocks have their apertures communicating with one another so as to form a series of horizontal passageways for air through the interior of the thermal mass. This thermal mass also can be utilized as a backup unit for storage of cold as an alternative mode of operation.

Cooling is provided by a series of interconnecting cooling walls comprised of staggered hollow cement blocks whose apertures are positioned so as to permit continuous air movement horizontally and vertically through the interior of the interconnecting cooling walls. These interconnecting cooling walls serve a dual purpose of providing structural support for the room enclosure and generating cool air.

A circulation system interconnects the solar energy collector, the thermal mass, the cooling walls and the area to be heated or cooled. This circulation is provided by a network of metal ducts, pipes, an air handler, a circulating fan, a gas heater and dampers, all adapted so as to provide the following seven modes of operation, as heating and cooling needs might dictate:

Mode 1—heating area to be heated on sunny days by conveying heat from said solar energy collector through said storage means to area to be heated such as a house.

Mode 2—heating area to be heated on cloudy days or evenings by recirculating heat from said storage means to area to be heated such as a house and return to said storage means, Mode 3—recharging said storage means with heat on sunny days by recirculating warmed air from said solar energy collector to said storage means and return to said solar energy collector, Mode 4—heating area to be heated on cloudy days or evenings by circulating heat from said gas heater to area to be heated such as a house, Mode 5—cooling area to be cooled on warm days or evenings by conveying cooled air from said cooling means to the area to be cooled, such as a house, Mode 6—charge said storage means as a backup cold air storage unit by circulating cool night air from outside to said storage means through the area to be cooled, such as a house, and return to said storage means. Once charged with cool air, said storage means is a source of cooling for future utilization using Mode 2, Mode 7—heating area to be heated directly on sunny days by conveying warmed air from said solar energy collector to the area to be heated, such as a house, by-passing said storage means.

The thermal mass and cooling walls disclosed are enclosed either in a room external to the structure to be serviced or beneath such structure. The room external to the area to be heated or cooled is attached thereto on any side and is bermed completely on all exposed structural walls. These structural walls are interconnected with the circulation system described above and are a series of interconnecting cooling walls comprised of staggered hollow cement blocks whose apertures are positioned and adapted so as to permit continuous air movement horizontally and vertically through the interior of said interconnecting cooling walls which walls and room are capped by a superinsulated roof.

The alternate enclosure is a basement room, embedded in the earth beneath the area to be heated or cooled, whose structural walls are interconnected with the circulation system described above and are a series of interconnecting cooling walls comprised of staggered hollow cement blocks whose apertures are positioned and adapted so as to permit continuous air movement horizontally and vertically through the interior of said interconnecting cooling walls which walls and room are capped by a superinsulated roof.

In its best mode of heating operation on sunny days, solar heat received by the solar energy collector is drawn by the air handler from the solar energy collector through the metal ducts and piping to and through the horizontal passages for air in the thermal mass and on into the area to be heated such as a house. The thermal mass absorbs and retains any excess heat for future use. On cloudy days or evenings the dampers to the solar energy collector are closed and the heat stored in the thermal mass is recirculated to the area to be heated and back to the thermal mass by the air handler. Another alternative is to circulate warm air from the gas heater to the area to be heated.

On a sunny day, if the heat is not needed in the area to be heated, the dampers to the ducts servicing that area can be closed, the dampers to the solar energy collector can be opened and the circulating fan can be turned on to pull heat from the solar energy collector only to the thermal mass and back to the solar energy collector as a means of recharging the thermal mass with heat for future use.

In the best mode for the generation and circulation of cool air, the dampers to the solar energy collector and the thermal mass are closed and air is pulled by the air handler from the cooling walls to the area to be cooled and back through the cooling walls which achieve cool temperatures from the surrounding earth whether the walls be bermed or embedded in the earth. During summer months, the thermal mass can also be used as a backup cool air storage unit by closing the dampers to the solar energy collector, opening the dampers to the thermal mass and circulating the cool night air from the outside to and through the thermal mass which can absorb and store cool air as an alternative to heat.

On a sunny day the area to be heated can be serviced directly from the solar energy collector by closing the dampers connecting the thermal mass to the system thereby effectively bypassing the storage means.

OBJECTIVES OF THE INVENTION

The objectives of the present invention are to provide an improved thermal heat storage and cooling system which is:

(1) capable of manual or fully automatic operation;

(2) constructed of readily available, low cost materials, thus making it less expensive to build than systems known in the prior art designed to perform the same function;

(3) self-contained so that heat storage and generation of cool air can be embodied in the same system and could be installed without structural modification of the structure to be heated or cooled;

(4) versatile, in that the heat storage and cool air generation means are independent and the system can be used as an exterior installation, located on any side, for heating and cooling structures with no basement or can be used as an interior installation utilizing the earth beneath such structures;

(5) easy to control to minimize loss of energy and provide uniform flow of warm or cool air;

(6) multi-functional in that the heat storage and cooling means serve as structural support, backup storage, or other alternate needs;

(7) constructed with fewer components and simpler design to provide more reliable operation and less maintenance under heavy usage conditions.

Other objectives and advantages of the present invention will be apparent during the course of the following detailed description.

DETAILED DESCRIPTION OF THE PREFERRED EMBODIMENT OF THE INVENTION

Figure 1:
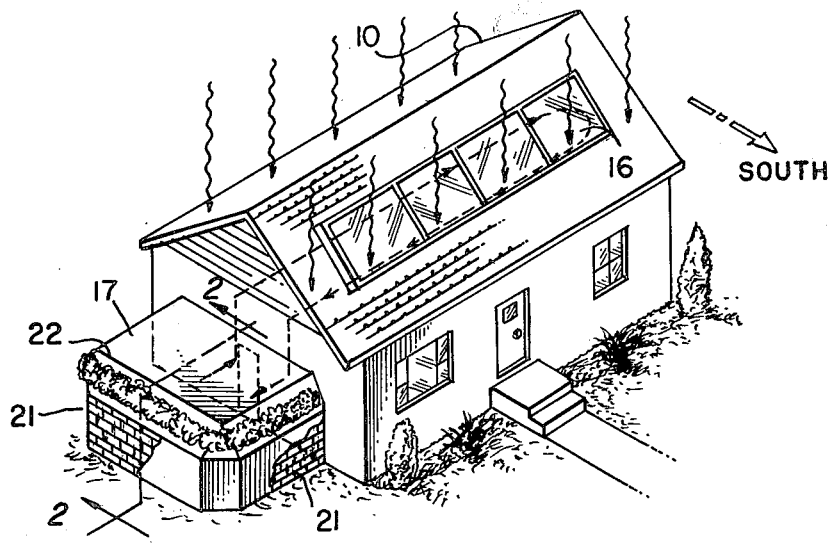
FIG. 1 is a perspective view of a thermal heat storage and cooling system constructed in accordance with the principles of the present invention showing the above ground version of the installation including the solar energy collector, the cinder block retaining wall for the bermed enclosure, the vegetation planted atop the berm and the access door to the structure to be serviced, in this example, a house.

The improved thermal heat storage and cooling system is a self-contained, multi-functional system for utilizing solar energy and the cooling properties of the earth in a versatile, economic manner. Using ready available materials such as earth, hollow cement block, plastic sheeting, sand and wood, the system is inexpensive to construct and maintain and is designed for maximum energy savings within the limits of the materials. Throughout the following detailed description of the present invention like reference numerals are used to denote like components disclosed in the accompanying drawings, FIGS. 1-5.

Figure 2:
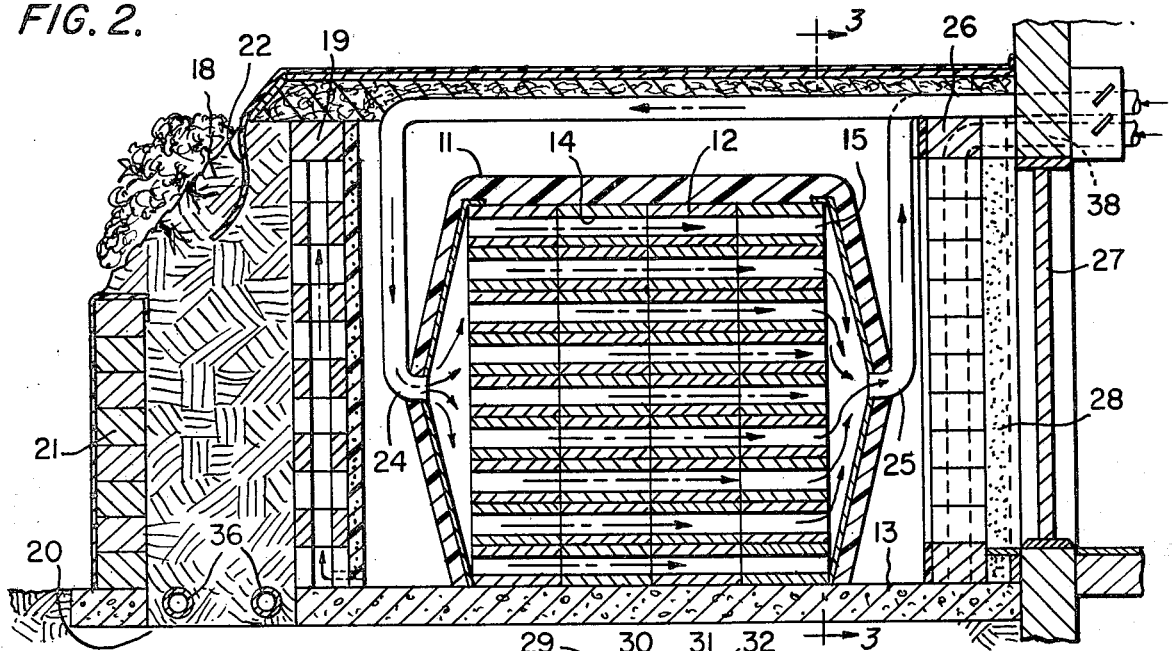
FIG. 2 is a side sectional view taken along line 2—2 of FIG. 1 showing the details of the berming construction, the cooling walls and the horizontal passageways for air through the thermal mass.

As shown in FIG. 1, the above-ground version of the present invention can be installed external to, but attached on any side of the area to be heated, such as house 10. Storage means, which is thermal mass 11 shown in detail in FIG. 2, is a superinsulated cube of hollow cement blocks, exemplified at numeral 12, assembled on a superinsulated concrete slab 13. Each of said hollow cement blocks 12 has been positioned so that their apertures, exemplified at numeral 14, communicate with one another so as to form a series of horizontal passageways, exemplified at numeral 15, for air through the interior of thermal mass 11. Although not shown in FIG. 2, alternate horizontal passages vertically or laterally could be filled with cement or sand to increase the effective mass of said cube. Preferably said hollow cement blocks 12 would contain a magnesium additive to increase the conductance of said blocks.

Figure 3:
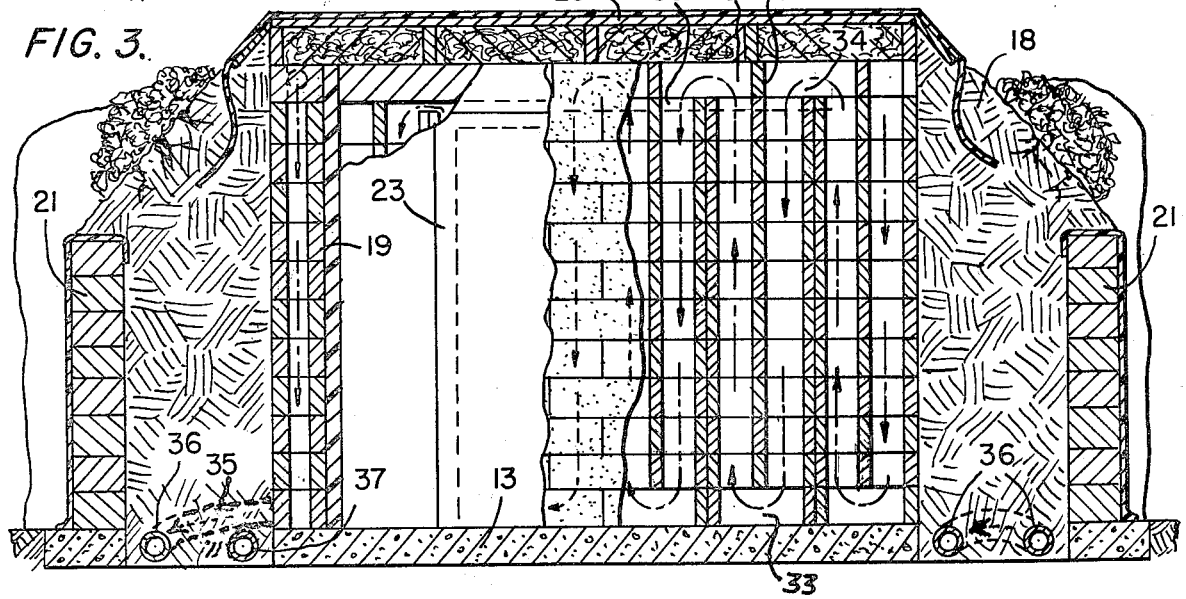
FIG. 3 is a rear sectional view taken along line 3—3 of FIG. 2 showing the details of the roof construction and supporting walls of the bermed room, as well as the arrangement of the staggered hollow cement blocks of the cooling walls positioned and adapted to permit the flow of cold air horizontally and vertically through the interior of the walls.

The typical thermal heat source would be a conventional solar energy collector 16 which could be located, facing South, on the roof of house 10 as shown in FIG. 1, or located in the attic below or mounted independently atop the external enclosure means which is a room 17 external to the area to be heated or cooled but attached thereto on any side and is bermed completely on all exposed structural walls as shown in FIGS. 1–3. The berming material, such as earth, exemplified at numeral 18, is placed against the outside of the three exterior cooling walls, exemplified at numeral 19, from the earth's surface, exemplified at numeral 20, up to the top of each of said exterior cooling walls 19. Although not shown in attached drawings, a column of sand could be inserted between berming material 18 and the outside of the three exterior cooling walls 19 to improve drainage. The berming material 18 is held in place by retaining walls 21 and covered for a short distance from the roof line with protective plastic strips 22 which extend just below the surface of berming material 18 to keep water away from exterior cooling walls 19. Vegetation is shown planted atop berming material 18 to stabilize the ground temperature of said berming material 18. Access to room 17 from house 10 is through door 23. Although not shown in the attached drawings, concrete slab 13 could be further insulated by including sawdust in the concrete mixture forming said slab. Thermal mass 11 is interconnected with the circulation means, which is detailed in FIG. 5, by input pipe 24 and output pipe 25.

Interior cooling wall 26 frames door 23 and is adjacent to outside wall 27 of house 10. A column of sand 28 further insulates room 17 from house 10 and provides drainage for condensation. Roof 29 of room 17 is constructed of conventional roof rafters filled in between with insulating material. Exterior cooling walls 19 and interior cooling wall 26 serve the dual function of structural support for room 17 and as the cooling means of the present invention. This cooling means, which is interconnected with the circulation means, is three interconnecting exterior cooling walls 19 and one interior cooling wall 26 each said wall comprised of staggered hollow cement blocks, exemplified at numeral 30, whose apertures, exemplified at numeral 31, are aligned in this embodiment over one other so that cool air generated therein can move vertically up and down through the column of hollow cement blocks 30 as shown best in FIG. 3. In this embodiment the top course, exemplified at numeral 32, and the bottom course, exemplified at numeral 33, of hollow cement blocks 30 are adapted so as to have a single aperture, exemplified at numeral 34, by removing the convential partition found between the two apertures 31 found in the conventional hollow cement block 30. Top course 32 and bottom course 33, of hollow cement blocks 30, having said single apertures 34, are then staggered one-half block to the left or right so that cold air from one column of hollow cement blocks 30 can travel horizontally to the adjacent column of hollow cement blocks 30 thereby permitting continuous air movement through the interior of the three interconnected exterior cooling walls 19 and the single interior cooling wall 26 when air is pulled through by the circulation means. The interior surface of exterior cooling walls 19 and interior cooling wall 26 are waterproofed to prevent moisture from entering the area where thermal mass 11 is located. Additional cooling effect is gained from the earth by routing the cool air from cooling wall output 35 through underground pipe 36 buried beneath the earth's surface 20 below bermal material 18 snaking around the three exterior cooling walls 19 and back to cold air duct 37 which leads to house 10. Air to be cooled enters said cooling means from house 10 at cooling wall input 38 located at the top course of hollow cement blocks 30 of interior cooling wall 26.

Figure 4:
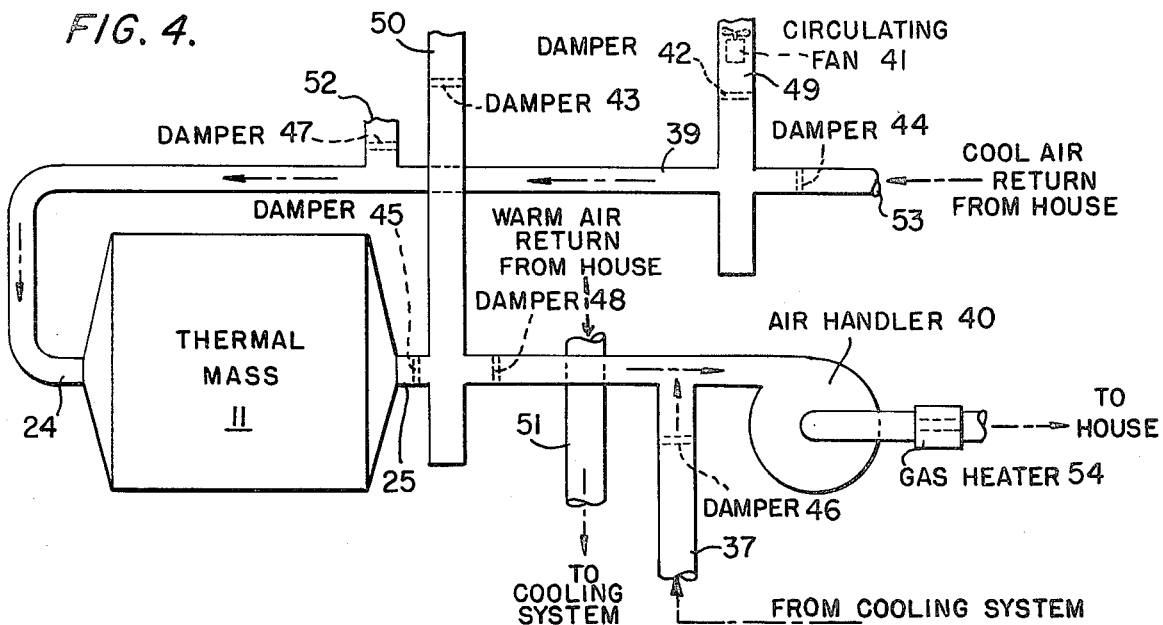
FIG. 4 is a schematic flow view of the circulation means showing the arrangement of the metal ducts, pipes, air handler, circulating fan, gas heater and dampers.
Figure 5:
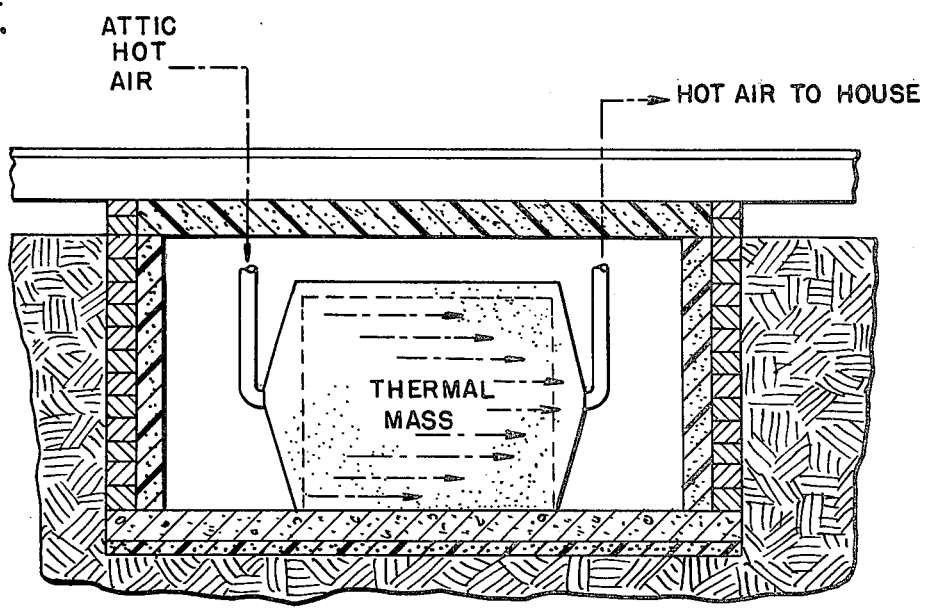
FIG. 5 is a schematic sectional view showing the general arrangement of the below-ground version of a thermal heat storage and cooling system constructed in accordance with the present invention. Details of the storage means and cooling means, not shown, are exactly the same as shown in FIGS. 2 and 3, except the adjacent earth surrounding the embedded room on three sides substitutes for the berming.

The circulation means of the present invention, shown as a flow diagram in FIG. 4, is a network comprised of metal ducts, exemplified at numeral 39, input pipe 24 and output pipe 25, cooling wall input 38, cooling wall output 35, underground pipe 36, cold air duct 37, which interconnect solar energy collector 16 with thermal mass 11 and house 10. Also said network interconnects exterior cooling walls 19, interior cooling wall 26 and house 10. During the heating modes, air handler 40 is inserted, as a component of said network and circulation means, between house 10 and thermal mass 11. During the cooling modes, air handler 40 is inserted between house 10 and exterior cooling walls 19 and interior cooling wall 26. Circulating fan 41, as a component of said network and circulation means, circulates warm air between thermal mass 11 and solar energy collector 16 during the recharging mode of the present invention. Dampers 42, 43, 44, 45, 46, 47 and 48 are additional components of said network and circulation means, as is gas heater 54, an auxillary source of heat.

During Mode 1 when it is desired to heat house 10 on sunny days, dampers 43, 46 and 47 are closed and dampers 42, 44, 45 and 48 are opened. Air handler 40 draws warm air from solar energy collector 16 down through input pipe 24, through thermal mass 11 and out through output pipe 25 to house 10.

During Mode 2 when it is desired to heat house 10 on cloudy days or evenings, dampers 42, 43, 46 and 47 are closed, dampers 44, 45 and 48 are opened and air handler 40 recirculates warm air stored in thermal mass 11 by drawing air from house 10, through duct 39, down through input pipe 24, through thermal mass 11 and out through output pipe 25 to house 10, then back to thermal mass 11.

During Mode 3 when it is desired to recharge thermal mass 11 on sunny days and house 10 requires no heat, dampers 42, 43 and 45 are opened, dampers 44, 46, 47 and 48 are closed and air handler 40 deactivated. Circulation fan 41 is activated, recirculating warm air from solar energy collector 16 down through duct 49 through input pipe 24 and thermal mass 11, out through output pipe 25 and back up to solar energy collector 16 through duct 50 which with duct 49 is a component of said network and said circulation means.

During Mode 4, when it is desired to heat house 10 on cloudy days or evenings, when there is no heat available in thermal mass 11, dampers 42, 43, 46 and 47 are closed, dampers 44, 45 and 48 are opened and air handler 40 draws air from house 10, through 39, down through input pipe 24, through thermal 11, out through outpipe 25 and through gas heater 54 to house 10.

During Mode 5 when it is desired to cool house 10 on warm days or evenings, dampers 42, 43, 44, 45, 47 and 48 are closed and damper 46 is opened. Air handler 40 draws air from house 10 through duct 51 which is a component of said network and circulation means, to cooling wall input 38, through interior cooling wall 26, and exterior cooling walls 19, out cooling wall output 35, through underground pipe 36, through cold air duct 37 to house 10, the area to be cooled.

During Mode 6, on a cool evening, when it is desired to charge thermal mass 11 with cold night air from outside of room 17, thus using thermal mass 11 as a backup cold storage unit, dampers 42, 43 and 46 are closed, dampers 44, 45, 47 and 48 are opened. Upon activation, air handler 40 pulls cold air from outside, through air input 52, which is a component of said network and circulation means, through input pipe 24, thermal mass 11, and output pipe 25 to house 10. The air returns through cool air return 53, which is a component of said network and circulation means, and duct 39 to point of origin, thus cooling house 10 while at the same time storing residual amounts of cool air in thermal mass 11 for later utilization using Mode 2.

During Mode 7, when it is desired to heat house 10 directly from solar energy collector 16, dampers 42, 43, 44 and 48 are opened, and dampers 45, 46 and 47 are closed. Upon activation, air handler 40 pulls warm air from solar energy collector 16, down through duct 50 to the area to be heated, house 10. The air is returned through cool air return 53 and duct 49 to solar energy collector 16, thus completing the cycle.

I claim:

1. In combination with a house or other structure, a solar energy collector for heating air, and an auxiliary gas heater for heating air, the improved thermal heat storage and cooling system comprising:

storage means, for storing heat or cold, having a superinsulated cube of hollow cement blocks assembled on a concrete slab, each of said hollow cement blocks being positioned so that their apertures communicate with one another so as to form a series of horizontal passageways for air through the interior of said hollow cement blocks, and external enclosure means, external to the area to be heated or cooled but attached thereto on any side, forming a room to enclose said storage means, and cooling means comprising three interconnecting exterior cooling walls and a single interior cooling wall each said wall waterproofed on the interior surface and comprised of staggered hollow cement blocks whose apertures are aligned over one another so that cool air generated therein can move vertically up and down through the column of hollow cement blocks, the top course and bottom course of said hollow cement blocks adapted so as to have a single aperture and staggered so that cold air from one column of hollow cement blocks can travel horizontally to the adjacent column of hollow cement blocks, permitting continuous air movement through the interior of said three interconnecting exterior cooling walls and said single interior cooling wall when air is pulled through by circulation means, and circulation means, to carry air to and from said area to be heated and cooled, having a network comprised of metal ducts, input pipe, output pipe, cooling wall input, cooling wall output, underground pipe, and cold air duct, which said network interconnects said solar energy collector, said storage means and said cooling means with said area to be heated and cooled and with each other, and a roof, filled with insulating material, which with said external enclosure means and said concrete slab form an enclosure for said storage means and said cooling means used to heat and cool air carried by said circulating means to and from said area to be heated and cooled.

2. The improved thermal heat storage and cooling system of claim 1 wherein berming material, such as earth, is placed against the outside, and up to the top, of each said three interconnecting exterior cooling walls.

3. The improved thermal heat storage and cooling system of claim 1 wherein said external enclosure means is above-ground, installed external to, but attached to, said house to be heated and cooled, and wherein berming material, such as earth, is placed against the outside, and up to the top, of each said three interconnecting exterior cooling walls.

4. The improved thermal heat storage and cooling system of claim 1 wherein said external enclosure means is below-ground, installed external to, but attached by said single interior cooling wall to, said house to be heated and cooled, and wherein said three interconnecting exterior cooling walls are surrounded to the top of each said wall by the adjacent earth.

5. The improved thermal heat storage and cooling system of claim 1 whereby air from within said house is circulated through said cooling means, transferring the heat energy of said air to said three interconnecting exterior cooling walls and said single interior cooling wall, to cool said air and whereby said cold air is then recirculated to said house.

6. The improved thermal heat storage and cooling system of claim 1 wherein said storage means is charged with cold night air from outside for the subsequent generation of cool air by circulation of air from said house through said storage means and back to said house.

7. The improved thermal heat storage and cooling system of claim 1 wherein said superinsulated cube of hollow cement blocks is constructed from conventional hollow cement blocks cast from cement containing a magnesium additive to improve the thermal conductivity of said storage means.

8. Cooling means comprising three interconnecting exterior cooling walls and a single interior cooling wall, each said wall waterproofed on the interior surface and comprised of staggered hollow cement blocks, whose apertures are aligned over one another so that cool air generated therein can move vertically up and down through the column of hollow cement blocks, the top course and bottom course of said hollow cement blocks adapted so as to have a single aperture and staggered so that cold air from one column of hollow cement blocks can travel horizontally to the adjacent column of hollow cement blocks, permitting continuous air movement through the interior of said three interconnecting exterior cooling walls and said single interior cooling wall when air is pulled through by circulation means.

* * * * *